US012716497B2

(12) United States Patent
Clark et al.

(10) Patent No.: US 12,716,497 B2
(45) Date of Patent: Aug. 25, 2026

(54) OUTBOARD DRIVE AXLE HUB SEAL WITH VENTING

(71) Applicant: Freudenberg-NOK General Partnership, Plymouth, MI (US)

(72) Inventors: Keith Clark, Rumney, NH (US); Jody Fowler, Grafton, NH (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 0 days.

(21) Appl. No.: 19/080,431

(22) Filed: Mar. 14, 2025

(65) Prior Publication Data

US 2025/0224035 A1 Jul. 10, 2025

Related U.S. Application Data

(63) Continuation-in-part of application No. 18/408,880, filed on Jan. 10, 2024, now Pat. No. 12,281,703.

(51) Int. Cl.
*F16J 15/3232* (2016.01)
*F16J 15/3276* (2016.01)

(52) U.S. Cl.
CPC ....... *F16J 15/3232* (2013.01); *F16J 15/3276* (2013.01)

(58) Field of Classification Search
CPC .. F16J 15/3232; F16J 15/3256; F16J 15/3264; F16J 15/3276
USPC .......................................................... 277/562
See application file for complete search history.

(56) References Cited

U.S. PATENT DOCUMENTS 3,341,265 A * 9/1967 Paterson ............. F16C 33/7813 277/565
4,285,526 A * 8/1981 Klinteberg ........... F16J 15/3256 277/575
4,432,557 A * 2/1984 Drucktenhengst ... F16J 15/3256 277/560
4,962,936 A * 10/1990 Matsushima ........ F16J 15/3256 277/400
5,004,248 A * 4/1991 Messenger ........... F16J 15/3256 277/423
5,096,207 A * 3/1992 Seeh .................... F16J 15/3256 277/575
5,186,472 A * 2/1993 Romero ............... F16J 15/3256 277/572
5,211,406 A * 5/1993 Katzensteiner ...... F16J 15/3256 277/572
5,575,568 A * 11/1996 Rigaux ................. F16C 41/007 384/446

(Continued)

*Primary Examiner* — Nathan Cumar
(74) *Attorney, Agent, or Firm* — Harness, Dickey & Pierce, P.L.C.

(57) ABSTRACT

A radial shaft seal includes an outer cover having a cylindrical portion configured to be received in a bore of a first member and a radial portion extending radially inward from an end of the cylindrical portion. An inner seal element includes a metal case with an inner cylindrical portion configured to be received on a second member and the metal case includes a radial portion extending radially outward from the inner cylindrical portion. The inner seal element includes a dynamic oil seal lip that extends from the radial portion of the metal case and engages the radial portion of the outer cover. The inner seal element includes a static oil seal lip that extends from the radial portion of the metal case and engages an inner cover.

16 Claims, 3 Drawing Sheets

(56) References Cited

U.S. PATENT DOCUMENTS 5,649,710 A * 7/1997 Kanda .................. F16J 15/3244 277/420
5,944,321 A * 8/1999 Niebling ............. F16C 33/7889 277/566
5,975,534 A * 11/1999 Tajima ................. F16J 15/3264 277/572
6,450,503 B1 * 9/2002 Dossena .............. F16J 15/3256 277/572
6,561,519 B1 * 5/2003 Frese ................... F16J 15/3232 277/552
6,601,855 B1 * 8/2003 Clark ....................... F16J 3/042 277/561
6,776,420 B2 * 8/2004 Vignotto .............. F16J 15/3264 277/572
8,474,825 B2 * 7/2013 Nakagawa ............. F16J 15/164 277/572
8,828,178 B2 * 9/2014 Yamamoto ............ F16C 41/007 277/572
9,845,883 B2 * 12/2017 Larson ................. F16J 15/3252
9,995,396 B1 * 6/2018 Maskaliunas ........ F16J 15/3268
10,907,689 B2 * 2/2021 Clark .................... F16C 33/768
11,754,188 B2 * 9/2023 Manley .................. F16J 15/453 277/412
11,773,906 B2 * 10/2023 Kanzaki .............. F16C 33/7886 277/346
11,940,050 B2 * 3/2024 Morris ................. F16J 15/3232
12,281,703 B1 * 4/2025 Clark ................... F16J 15/3252
2002/0011710 A1 * 1/2002 Oldenburg ........... F16J 15/3256 277/612
2003/0016892 A1 * 1/2003 Vignotto ............. F16C 33/7883 384/448
2012/0068419 A1 * 3/2012 Berdichevsky ........ F16J 15/164 277/549
2012/0126490 A1 * 5/2012 Maskaliunas ............ F16J 15/48 277/572
2012/0313328 A1 * 12/2012 Larson ................. F16J 15/3276 277/549
2013/0127119 A1 * 5/2013 Haepp ................. F16C 33/7889 277/572
2016/0298769 A1 * 10/2016 Angiulli ................ F16C 33/805
2016/0298771 A1 * 10/2016 Angiulli .............. F16C 33/7823
2018/0106373 A1 * 4/2018 Toth ..................... F16J 15/3232
2019/0390775 A1 * 12/2019 Clark ................... F16J 15/3456
2020/0173558 A1 * 6/2020 Sabotta ................ F16J 15/3256

* cited by examiner

OUTBOARD DRIVE AXLE HUB SEAL WITH VENTING

CROSS-REFERENCE TO RELATED APPLICATIONS

This application is a continuation-in-part of U.S. patent application Ser. No. 18/408,880 filed on Jan. 10, 2024. The entire disclosure of the above application is incorporated herein by reference.

FIELD

The present disclosure relates to an outboard drive axle hub seal with venting.

BACKGROUND

This section provides background information related to the present disclosure which is not necessarily prior art.

Conventional oil lubricated drive axle wheel hubs contain an oil seal to contain oil within a common oil sump shared with the axle differential; these axles include ventilation features which prevent excessive internal pressures from developing since excessive pressure is known to degrade the performance of the dynamic oil seals used within the system. Alternative solutions for wheel end are proposed for an independent wheel hub oil sump, requiring inboard & outboard dynamic hub seals to contain the oil. It is impractical to ventilate the independent oil sump formed between them.

SUMMARY

This section provides a general summary of the disclosure, and is not a comprehensive disclosure of its full scope or all of its features.

According to an aspect of the present disclosure a radial shaft seal includes an outer cover having a cylindrical portion configured to be received in a bore of a first member and a radial portion extending radially inward from an end of the cylindrical portion. An inner seal element includes a metal case with an inner cylindrical portion configured to be received on a second member and the metal case includes a radial portion extending radially outward from the inner cylindrical portion. The inner seal element includes a dynamic oil seal lip that extends from the radial portion of the metal case and engages the radial portion of the outer cover. The inner seal element includes a static oil seal lip that extends from the radial portion of the metal case. An inner cover includes a cylindrical inner portion that engages the inner cylindrical portion of the metal case of the inner seal element and a radial portion that extends radially outward from the cylindrical inner portion. The static oil seal lip engages the radial portion of the inner cover. A vent passage is provided from the oil side to a cavity defined between the static oil seal lip, the inner cover and the metal case of the inner seal element.

According to a further aspect, the vent passage extends through at least one thru hole in the metal case of the inner seal element.

According to a further aspect, the vent passage extends through at least one vent channel that passes around the inner cylindrical portion of the metal case of the inner seal element.

According to a further aspect, the at least one vent channel is formed in a rubber over-mold on the inner cylindrical portion of the metal case of the inner seal element.

According to a further aspect, the cylindrical inner portion of the inner cover wraps around an end of the inner cylindrical portion of the metal case of the inner seal element.

According to a further aspect, an outer diameter of the radial portion of the inner cover is larger than an inner diameter of the radial portion of the outer cover.

According to a further aspect, the radial portion of the outer cover includes an over-molded seal lip that engages the cylindrical portion of the inner cover.

According to an aspect of the present disclosure a radial shaft seal for sealing between a first member and a second member, includes an outer cover having a cylindrical portion configured to be received in a bore of the first member and a radial portion extending radially inward from an end of the cylindrical portion. An inner seal element includes a metal case with an inner cylindrical portion configured to be supported on the second member and the metal case including a radial portion extending radially outward from the inner cylindrical portion, the inner seal element including a dynamic oil seal lip that extends from the radial portion of the metal case and engages the radial portion of the outer cover, the inner seal element including a static oil seal lip that extends from the radial portion of the metal case. An inner cover includes a cylindrical inner portion that is supported on the second member and a radial portion that extends radially outward from the cylindrical inner portion, the static oil seal lip engaging the radial portion of the inner cover.

According to a further aspect, a shaft sleeve having an inner cylindrical portion is supported on the second member and a radial portion extending on an outboard side of the outer cover.

According to a further aspect, a plurality of dust lips extend from the radial portion of the outer cover and engaging the shaft sleeve.

According to a further aspect, one of the plurality of dust lips engage the cylindrical portion of the shaft sleeve.

According to a further aspect, a bumper extends from the radial portion of the outer cover and engaging the radial portion of the shaft sleeve.

According to a further aspect, the cylindrical inner portion of the inner cover in disposed on the cylindrical portion of the shaft sleeve.

According to a further aspect, the inner cylindrical portion of the metal case of the inner seal element is disposed on the cylindrical inner portion of the inner cover.

The cassette seal with venting feature seeks to resolve the problem of excessive internal pressure by incorporating a venting function within the outboard seal so excessive pressure does not degrade the oil seal performance. Further areas of applicability will become apparent from the description provided herein.

The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
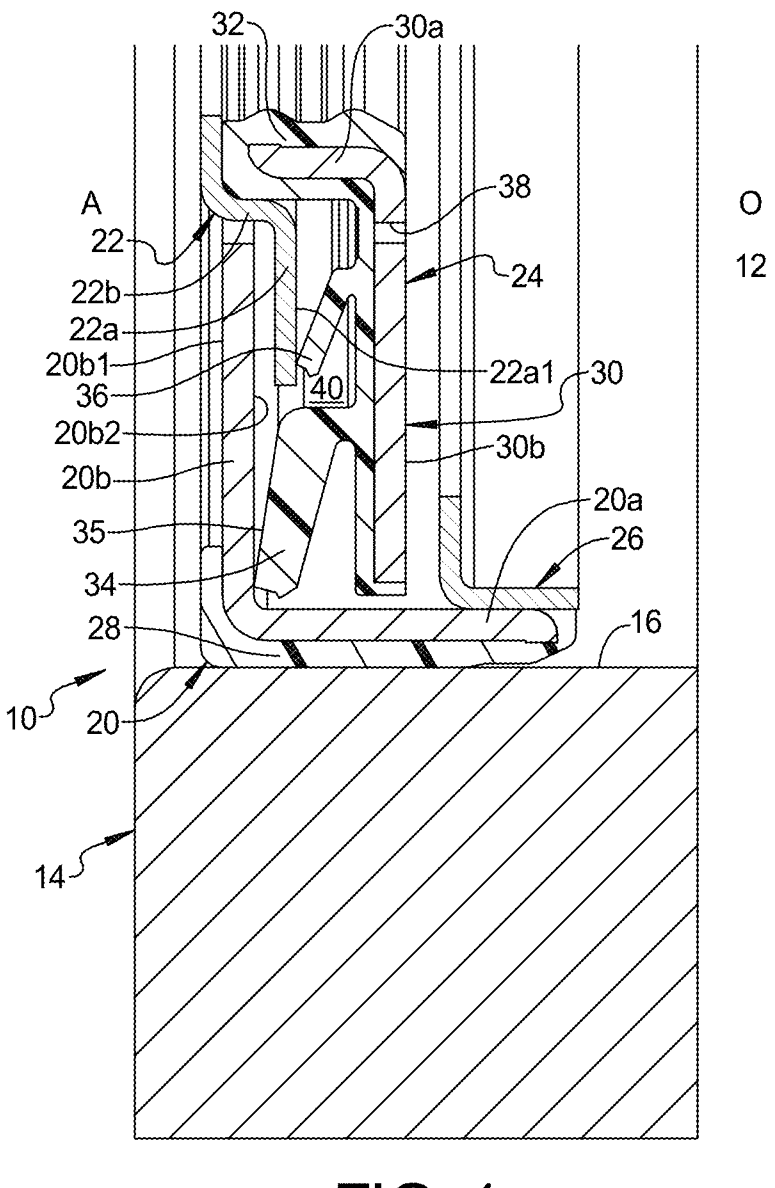
FIG. 1 is a cross-sectional view of the cassette type radial shaft seal according to the principles of the present disclosure.

With reference to FIG. 1, a cassette type radial shaft seal 10 is provided for retaining oil and limiting internal pressure build within a sealed hub cavity 12 is positioned at the outboard location of a sealed drive axle hub 14. The cassette type radial shaft seal 10 includes three primary elements: an outer cover 20, an inner cover 22, and an inner seal element 24. Optionally, an assembly ring 26 can be used to prevent disassembly of the cartridge elements.

The outer cover 20 is a thin-walled metal ring including a cylindrical portion 20*a* and a radial portion 20*b*. Optionally, the cylindrical portion 20*a* can be covered with rubber 28. The outer cover 20 has a cylindrical outer diameter which is press fit into the wheel hub bore 16 forming a static seal and retaining the outer cover 20 within the hub 14. The outer cover 20 then rotates with the wheel hub 14. The outer cover 20 has a radial portion 20*b* extending from the air side A of the outer diameter radially inward toward the inner diameter. The radial portion 20*b* provides an outboard surface 20*b*1 that can be used to press the seal assembly 10 into the hub bore 16, and an inner surface 20*b*2 which forms the rotating portion of the dynamic oil sealing interface. Continuing beyond this dynamic sealing interface, the radial portion 20*b* extends still further inward.

The inner seal element 24 includes a metal case 30 having a cylindrical inner portion 30*a* and a radial portion 30*b* that extends radially outward from the cylindrical inner portion 30*a*. An inside diameter of the cylindrical inner portion 30*a* of the inner seal element 24 can be covered with rubber 32 and sized to retain the inner seal portion 24 to the shaft 18 (shown in FIG. 2) and to form a static seal against the shaft 18. The inner seal element 24 further includes a dynamic oil sealing main lip 34 extending radially outward and diagonally toward the airside to contact the inner surface 20*b*2 of the radial portion 20*b* of the outer cover 20 with an axial interference fit. Because the oil sealing main lip 34 is extending outward, centrifugal forces acting on the oil film that develops at the seal interface during use promotes the oil flow back to the oil side, enhancing the performance of the seal. The dynamic oil seal lip 34 may also include an asymmetric profile, grooves, ribs 35, or other features to promote the sealing at the interface with the inner surface 20*b*2 of the radial portion 20*b* and the pumping of oil back to the oil side of the dynamic oil sealing main lip 34.

The inner seal element 24 additionally includes a static oil sealing lip 36, positioned at a diameter smaller than the dynamic sealing main lip 34 and extending radially outward and diagonally toward the airside to contact an inner surface 22*a*1 of a radial portion 22*a* of the inner cover 22 with an axial interference fit. The inner seal element 24 includes one or more thru holes 38 such that the cavity formed between the static oil seal lip 36 and the inner cover 22 is contiguous with and in fluid flow communication with the sealed oil cavity 12. Because the static oil seal lip 36 is extending outward, pressure internal to the sealed cavity can act to deflect the static oil seal lip 36. The static oil seal lip parameters are set such that under a moderate pressure, oil can be retained at the static sealing interfaces and as pressure increases beyond a moderate level the static oil seal lip 36 will open to prevent an excess pressure.

The inner cover 22 is a thin-walled ring attached to the inner seal element 24. The inner cover 22 includes a cylindrical inside diameter portion 22*b* that is press fit to the cylindrical inner portion 30*a* of the inner seal element 24, attaching it and forming a static seal. The inner cover 22 includes the radial portion 22*a* extending from the cylindrical portion 22*b*. As discussed above, the radial portion 22*a* forms a static sealing interface for the inner seal element 24 static sealing lip 36. The radial portion 22*a* extends beyond an inside diameter of the radial portion 20*b* of the outer cover 20, into a trough region 40 formed between the outer cover 20 and inner seal element 24 airside A, such that oil escaping the sealed cavity during periods of venting is drained into this trough region for transfer back to the sealed cavity by the pumping action of the dynamic oil seal lip.

Optionally, the assembly ring 26 can be used to prevent the removal of inner seal-inner cover assembly 22, 24 from the outer cover 20. Alternatively, a curl could be formed at the oil side edge of the cylindrical portion 20*a* of the outer cover 20; or the parts could be handled in a manner that would prevent the disassembly (still further alternative is the individual elements could be assembled as separate components to achieve the assembled arrangement).

Figure 2:
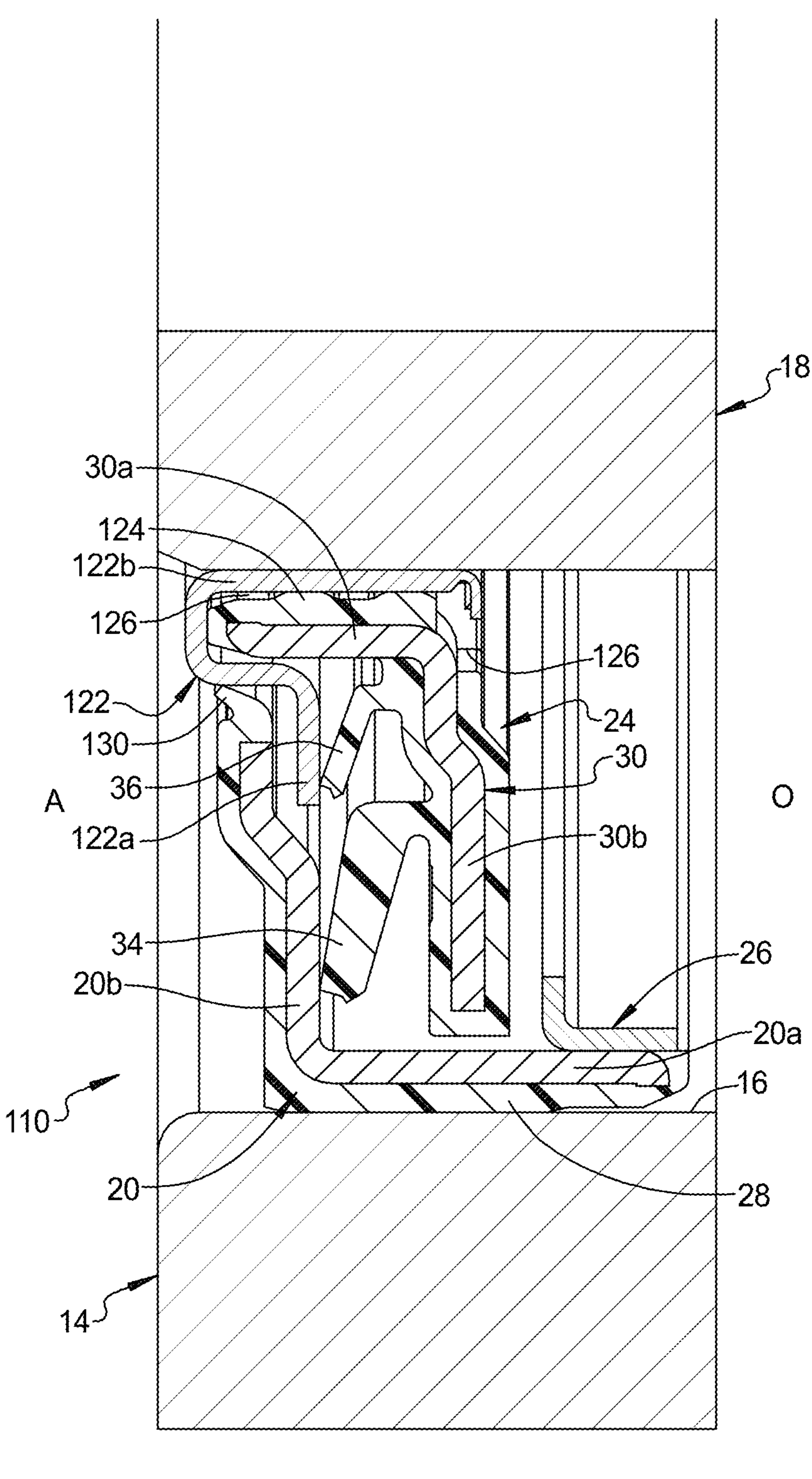
FIG. 2 is a cross-sectional view of the cassette type radial shaft seal according to a second embodiment of the present disclosure.

As an alternative as shown in FIG. 2, the inner cover 122 of the cassette type radial shaft seal 110 can be modified to include an a cylindrical inside diameter portion 122*b* that is wrapped around the cylindrical inner portion 30*a* of the inner seal element 24 with over-molded rubber 124 therebetween. The over-molded rubber 124 defines at least one vent channel 126 that communicates between the cavity formed between the static oil seal lip 36 and the inner cover radial portion 122*a* and the oil side O of the seal system. The inner cover 122 includes the radial portion 122*a* extending from the cylindrical portion 122*b*. As discussed above, the radial portion 122*a* forms a static sealing interface for the inner seal element 24 static sealing lip 36. The radial portion 122*a* extends beyond an inside diameter of the radial portion 20*b* of the outer cover 20, into a trough region 40 formed between the outer cover 20 and inner seal element 24 airside, such that oil escaping the sealed cavity during periods of venting is drained into this trough region for transfer back to the sealed cavity by the pumping action of the dynamic oil seal lip 34. An optional seal lip 130 can also be formed on the inner diameter of the radial portion 20*b* of the outer cover 20 to provide additional sealing to prevent debris from getting into the seal 110.

The cassette seal 10 with venting feature seeks to resolve the problem of excessive internal pressure by incorporating a venting function within the outboard seal so excessive pressure does not degrade the oil seal performance. Further areas of applicability will become apparent from the description provided herein.

Figure 3:
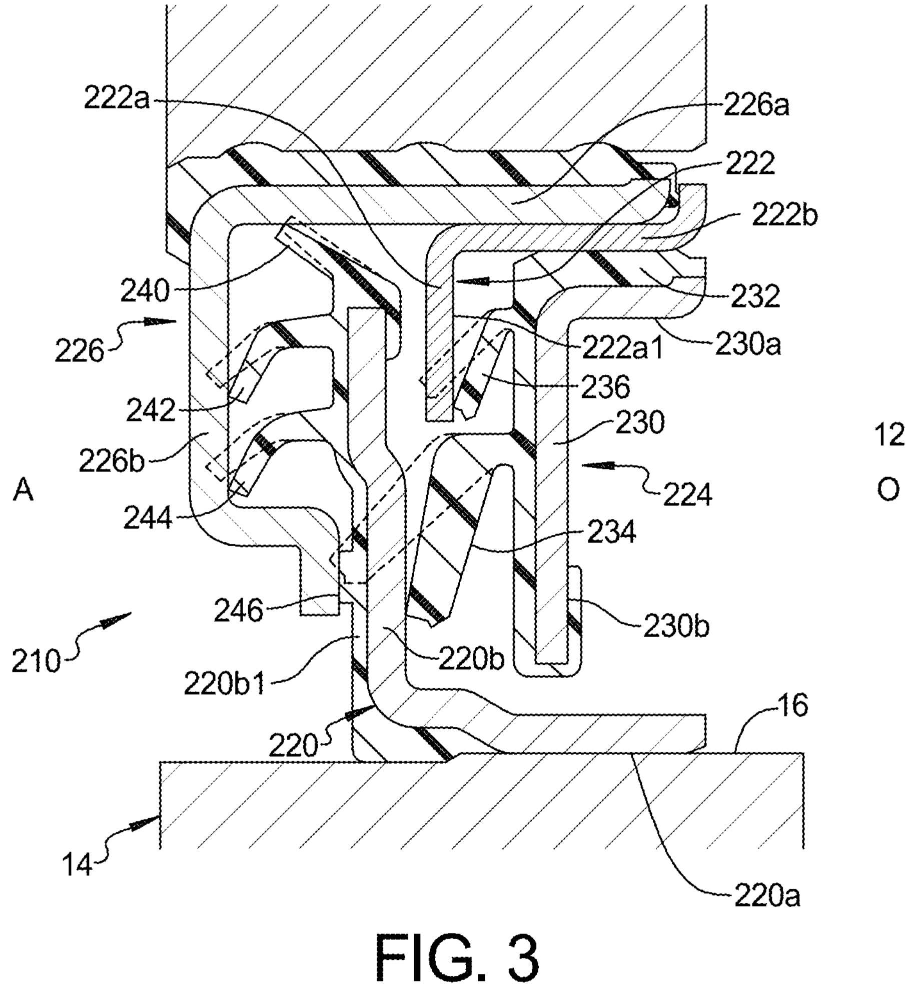
FIG. 3 is a cross-sectional view of the cassette type radial shaft seal according to a third embodiment of the present disclosure.

With reference to FIG. 3, a cassette type radial shaft seal 210 is provided for retaining oil and limiting internal pressure build within a sealed hub cavity 12 is positioned at the outboard location of a sealed drive axle hub 14. The cassette type radial shaft seal 210 includes four primary elements: an outer cover 220, an inner cover 222, an inner seal element 224, and a shaft sleeve 226.

The outer cover 220 is a thin-walled metal ring including a cylindrical portion 220*a* and a radial portion 220*b*. Optionally, the cylindrical portion 220*a* can be covered with rubber 228. The outer cover 220 has a cylindrical outer diameter which is press fit into the wheel hub bore 16 forming a static seal and retaining the outer cover 220 within the hub 14. The outer cover 220 then rotates with the wheel hub 14. The outer cover 220 has a radial portion 220*b* extending from the air side A of the outer diameter radially inward toward the inner diameter. The radial portion 220*b* provides an outboard surface 20*b*1 that supports an inner dust lip 240 at an inner end thereof, an intermediate dust lip 242, and an outer dust lip 244 that can all engage the shaft sleeve 226. The inner dust lip 240 can engage a cylindrical portion 226*a* of the shaft sleeve 226 and the intermediate dust lip 242 and the outer dust lip 244 can engage a radially extending portion 226*b* of the shaft sleeve 226. A rubber bumper 246 can extend from the outboard surface 220*b*1 and provides a spacing with the shaft sleeve 226. The radial portion 220*b* of the outer cover 220 includes an inner surface 220*b*2 which forms the rotating portion of the dynamic oil sealing interface.

The inner seal element 224 includes a metal case 230 having a cylindrical inner portion 230*a* and a radial portion 230*b* that extends radially outward from the cylindrical inner portion 230*a*. An inside diameter of the cylindrical inner portion 230*a* of the inner seal element 224 can be covered with rubber 232 and sized to retain the inner seal portion 224 to the inner cover 222 and to form a static seal against the inner cover 222. The inner seal element 224 further includes a dynamic oil sealing main lip 234 extending radially outward and diagonally toward the airside to contact the inner surface 220*b*2 of the radial portion 220*b* of the outer cover 220 with an axial interference fit. Because the oil sealing main lip 234 is extending outward, centrifugal forces acting on the oil film that develops at the seal interface during use promotes the oil flow back to the oil side, enhancing the performance of the seal. The dynamic oil seal lip 234 may also include an asymmetric profile, grooves, ribs, or other features to promote the sealing at the interface with the inner surface 220*b*2 of the radial portion 220*b* and the pumping of oil back to the oil side of the dynamic oil sealing main lip 234.

The inner seal element 224 additionally includes a static oil sealing lip 236, positioned at a diameter smaller than the dynamic sealing main lip 234 and extending radially outward and diagonally toward the airside to contact an inner surface 222*a*1 of a radial portion 222*a* of the inner cover 222 with an axial interference fit. Because the static oil seal lip 236 is extending outward, pressure internal to the sealed cavity can act to deflect the static oil seal lip 236. The static oil seal lip parameters are set such that under a moderate pressure, oil can be retained at the static sealing interfaces and as pressure increases beyond a moderate level the static oil seal lip 236 will open to prevent an excess pressure.

The inner cover 222 is a thin-walled ring attached to the inner seal element 224 and to the shaft sleeve 226. The inner cover 222 includes a cylindrical inside diameter portion 222*b* that is press fit to a cylindrical inner portion 226*a* of the shaft sleeve 226, attaching it and forming a static seal. The inner cover 222 includes the radial portion 222*a* extending from the cylindrical portion 222*b*. As discussed above, the radial portion 222*a* forms a static sealing interface for the inner seal element 224 static sealing lip 236. The radial portion 222*a* extends beyond an inside diameter of the radial portion 220*b* of the outer cover 220, into a trough region formed between the outer cover 220 and inner seal element 224 airside A, such that oil escaping the sealed cavity during periods of venting is drained into this trough region for transfer back to the sealed cavity by the pumping action of the dynamic oil seal lip 234.

The shaft sleeve 226 includes a radial portion 226*b* extending radially outward from the cylindrical inner portion 226*a*. The radial portion 226*b* can include a first portion spaced from the outer cover 220 by a first distance for engagement by the intermediate dust lip 242 and the outer dust lip 244 and can include a second portion spaced from the outer cover 220 by a second smaller distance for engagement by the rubber bumper 246.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as “inner,” “outer,” “beneath,” “below,” “lower,” “above,” “upper,” and the like, may be used herein for ease of description to describe one element or feature’s relationship to another element(s) or feature(s) as illustrated in the figures. Spatially relative terms may be intended to encompass different orientations of the device in use or operation in addition to the orientation depicted in the figures. For example, if the device in the figures is turned over, elements described as “below” or “beneath” other elements or features would then be oriented “above” the other elements or features. Thus, the example term “below” can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A radial shaft seal for sealing between a first member and a second member, comprising:

an outer cover having a cylindrical portion configured to be received in a bore of the first member and a radial portion extending radially inward from an end of the cylindrical portion;

an inner seal element having a metal case with an inner cylindrical portion configured to be supported on the second member and the metal case including a radial portion extending radially outward from the inner cylindrical portion, the inner seal element including a dynamic oil seal lip that extends from the radial portion of the metal case and engages the radial portion of the outer cover, the inner seal element including a static oil seal lip that extends from the radial portion of the metal case; and an inner cover including a cylindrical inner portion that is supported on the second member and a radial portion that extends radially outward from the cylindrical inner portion, the static oil seal lip engaging the radial portion of the inner cover.

2. The radial shaft seal according to claim 1, further comprising a shaft sleeve having an inner cylindrical portion supported on the second member and a radial portion extending on an outboard side of the outer cover.

3. The radial shaft seal according to claim 1, further comprising a plurality of dust lips extending from the radial portion of the outer cover and engaging the shaft sleeve.

4. The radial shaft seal according to claim 3, wherein one of the plurality of dust lips engage the cylindrical portion of the shaft sleeve.

5. The radial shaft seal according to claim 3, further comprising a bumper extending from the radial portion of the outer cover and engaging the radial portion of the shaft sleeve.

6. The radial shaft seal according to claim 1, wherein the cylindrical inner portion of the inner cover in disposed on the cylindrical portion of the shaft sleeve.

7. The radial shaft seal according to claim 6, wherein the inner cylindrical portion of the metal case of the inner seal element is disposed on the cylindrical inner portion of the inner cover.

8. A radial shaft seal for sealing between a first member and a second member, comprising:

an outer cover having a cylindrical portion configured to be received in a bore of the first member and a radial portion extending radially inward from an end of the cylindrical portion;

an inner seal element having a metal case with an inner cylindrical portion configured to be supported on the second member and the metal case including a radial portion extending radially outward from the inner cylindrical portion, the inner seal element including a dynamic oil seal lip that extends from the radial portion of the metal case and engages the radial portion of the outer cover, the inner seal element including a static oil seal lip that extends from the radial portion of the metal case;

an inner cover including a cylindrical inner portion that is supported on the second member and a radial portion that extends radially outward from the cylindrical inner portion, the static oil seal lip engaging the radial portion of the inner cover; and a shaft sleeve having an inner cylindrical portion supported on the second member and a radial portion extending on an outboard side of the outer cover and including a plurality of dust lips extending from the radial portion of the outer cover and engaging the shaft sleeve.

9. The radial shaft seal according to claim 8, wherein one of the plurality of dust lips engage the cylindrical portion of the shaft sleeve.

10. The radial shaft seal according to claim 8, further comprising a bumper extending from the radial portion of the outer cover and engaging the radial portion of the shaft sleeve.

11. The radial shaft seal according to claim 8, wherein the cylindrical inner portion of the inner cover is disposed on the cylindrical portion of the shaft sleeve.

12. The radial shaft seal according to claim 11, wherein the inner cylindrical portion of the metal case of the inner seal element is disposed on the cylindrical inner portion of the inner cover.

13. A radial shaft seal for sealing between a first member and a second member, comprising:

an outer cover having a cylindrical portion configured to be received in a bore of the first member and a radial portion extending radially inward from an end of the cylindrical portion;

an inner seal element having a metal case with an inner cylindrical portion configured to be supported on the second member and the metal case including a radial portion extending radially outward from the inner cylindrical portion, the inner seal element including a dynamic oil seal lip that extends from the radial portion of the metal case and engages the radial portion of the outer cover, the inner seal element including a static oil seal lip that extends from the radial portion of the metal case;

an inner cover including a cylindrical inner portion that is supported on the second member and a radial portion that extends radially outward from the cylindrical inner portion, the static oil seal lip engaging the radial portion of the inner cover; and a shaft sleeve having an inner cylindrical portion supported on the second member and a radial portion extending on an outboard side of the outer cover and including a plurality of dust lips extending from the radial portion of the outer cover and engaging the shaft sleeve, wherein one of the plurality of dust lips engage the cylindrical portion of the shaft sleeve.

14. The radial shaft seal according to claim 13, further comprising a bumper extending from the radial portion of the outer cover and engaging the radial portion of the shaft sleeve.

15. The radial shaft seal according to claim 13, wherein the cylindrical inner portion of the inner cover is disposed on the cylindrical portion of the shaft sleeve.

16. The radial shaft seal according to claim 15, wherein the inner cylindrical portion of the metal case of the inner seal element is disposed on the cylindrical inner portion of the inner cover.

* * * * *